(12) United States Patent
Nakagawa

(10) Patent No.: US 11,016,353 B2
(45) Date of Patent: May 25, 2021

(54) DISPLAY APPARATUS

(71) Applicant: Sakai Display Products Corporation, Osaka (JP)

(72) Inventor: Hidetoshi Nakagawa, Osaka (JP)

(73) Assignee: Sakai Display Products Corporation, Osaka (JP)

( * ) Notice: Subject to any disclaimer, the term of this patent is extended or adjusted under 35 U.S.C. 154(b) by 63 days.

(21) Appl. No.: 15/946,271

(22) Filed: Apr. 5, 2018

(65) Prior Publication Data

US 2018/0224705 A1   Aug. 9, 2018

Related U.S. Application Data

(63) Continuation-in-part of application No. PCT/JP2015/078392, filed on Oct. 6, 2015.

(51) Int. Cl.
    *G02F 1/1362* (2006.01)
    *G02F 1/13* (2006.01)
    *G02F 1/1368* (2006.01)

(52) U.S. Cl.
    CPC ...... *G02F 1/136259* (2013.01); *G02F 1/1309* (2013.01); *G02F 1/1368* (2013.01); *G02F 1/136286* (2013.01); *G02F 1/136263* (2021.01); *G02F 1/136272* (2021.01); *G02F 1/136295* (2021.01)

(58) Field of Classification Search
    CPC .............................................. G02F 1/136259
    USPC .......................................................... 257/72
    See application file for complete search history.

(56) References Cited

U.S. PATENT DOCUMENTS

| 2008/0062347 A1* | 3/2008 | Peng ................. G02F 1/136259 349/54 |
| 2009/0284679 A1 | 11/2009 | Kim et al. |
| 2011/0146066 A1 | 6/2011 | Kim et al. |
| 2015/0357355 A1 | 12/2015 | Itoh |

FOREIGN PATENT DOCUMENTS

| JP | 2008233506 A | 10/2008 |
| JP | 5505755 B2 | 5/2014 |
| WO | 2014109221 A1 | 7/2014 |

OTHER PUBLICATIONS

English Translation of PCT International Search Report, PCT Application No. PCT/JP2015/078392, Japan Patent Office. dated Dec. 8, 2015.

* cited by examiner

*Primary Examiner* — Hsin Yi Hsieh
(74) *Attorney, Agent, or Firm* — Snell & Wilmer L.L.P.

(57) ABSTRACT

A display apparatus includes thin-film transistors respectively provided for pixels arranged in a matrix form, one or more driving circuits provided at a side of one end of the display panel, a plurality of signal lines to each connect more than one of the plurality of thin-film transistors arranged in one line in the matrix form to the driving circuit, a plurality of spare lines formed to be connectable to any of the plurality of signal lines in an outer area of a display panel, and arranged separated from one another in an opposing region in the outer area, the opposing region being opposed to the driving circuits across the display area, and a metal pattern overlapping a first spare line and a second spare line with an insulating layer therebetween, so as to be connectable to the first spare line arranged in a first region and the second spare line arranged in a second region.

12 Claims, 12 Drawing Sheets

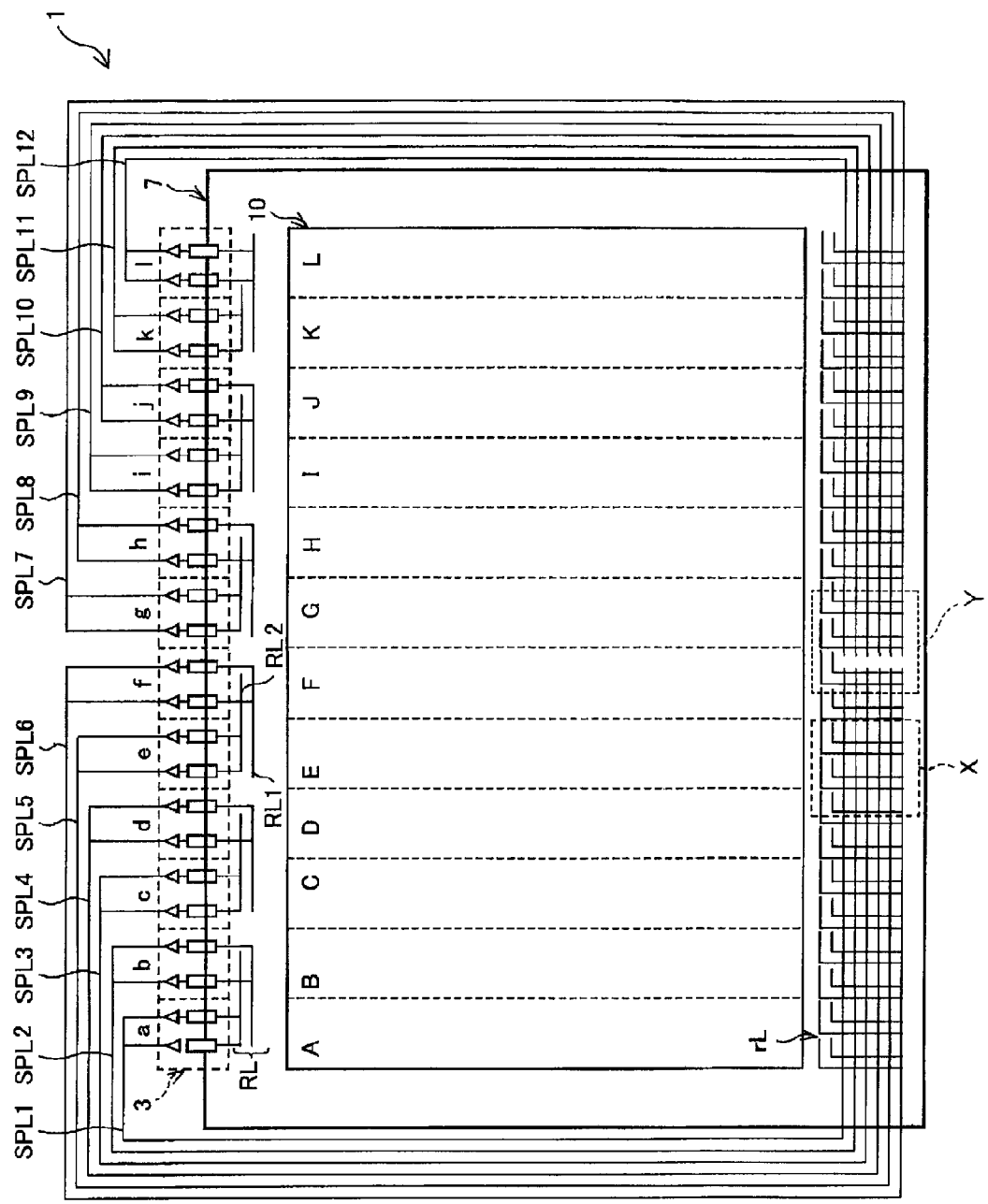

DISPLAY APPARATUS

CROSS-REFERENCE TO RELATED APPLICATION

This is a continuation-in-part of PCT international application No. PCT/JP2015/078392 filed on Oct. 6, 2015, incorporated herein by reference.

TECHNICAL FIELD

The present disclosure relates to a display apparatus having thin-film transistors for respective pixels arranged in a matrix form in a display area of a display panel, including a plurality of signal lines, each connecting a group of thin-film transistors arranged in a row direction or a column direction to one or more driving circuit to provide a signal for the group of thin-film transistors.

BACKGROUND OF THE INVENTION

For example, an active matrix type liquid crystal display apparatus includes a plurality of data-signal lines and a plurality of scan-signal lines arranged in a matrix form, and further, thin-film transistors and pixel electrodes connected thereto provided near the respective intersections of those signal lines. Such liquid crystal display apparatus are configured to change the orientation state of the liquid crystal by an on/off control of the thin-film transistor through the scan-signal line to apply an signal voltage to the respective pixel electrodes through the data-signal line so as to display image information.

In recent years, further improvement in the display quality is needed, and a line width of the data-signal line is becoming very small, such as 10 µm or less (e.g., 6 µm). Therefore, disconnections often occur in the lines during manufacturing processes. For example, disconnections can occur simply when dust is entangled during film formation or a pinhole is produced in a resist pattern during etching.

When a disconnection occurs in a data-signal line, the correct signal voltage is not applied to the pixel electrodes disposed beyond the position of disconnection, so that a black line (in the normally-black mode) or a bright line (in the normally-white mode) will appear on the display screen. This can be a serious defect from the viewpoint of display quality.

FIG. 1A and FIG. 1B are explanatory diagrams showing a method for repairing the disconnection defect in a conventional display apparatus.

This display apparatus 20 includes source driving circuits 22 and 23 arranged side by side above the display area (display screen) 21 with which to drive a group of thin-film transistors (not shown) arranged in the vertical direction. A plurality of data-signal lines S20 (only one data-signal line S20 is shown) are led from the source driving circuits 22 and 23, extended below the display area 21 across the display area 21, and connected to the respective sources of each group of thin-film transistors arranged in the vertical direction.

A spare line SPL20 to be used for repairing a disconnection occurring in the data-signal line S20 is formed in the periphery of the display area 21, such that the spare line SPL20 can be connected to each of end portions of the data-signal lines S20. Practically, a plurality of data-signal lines and a plurality of spare lines are provided, and the data-signal lines and spare lines are provided in a similar manner on the source driving circuit 23 side.

When a disconnection occurs in the data-signal line S20, as shown in FIG. 1A, correct signal voltage is not applied to the pixel electrodes disposed in the portion P which extends beyond the position of disconnection, so that a black line or a bright line appears on the display screen 21.

When this happens and then end portions of the data-signal line S20 in which a disconnection occurs are melt connected to the spare line SPL20, as shown in FIG. 1B, correct signal voltage can be applied to the pixel electrodes also in the portion P which is beyond the position of disconnection, so that the disconnection defect will be repaired. The term "melt connection (melt connect)" refers to a welding, by an irradiation with laser or the like, of two metal films (conductive films) separated from one another by an insulating layer.

Japanese Registered Patent No. 5505755 discloses a display substrate and a liquid crystal display apparatus which can reduce the contact resistance at the repair points and suppress the RC delay in the repaired signal line, by decreasing the number of the repair points to connect the repair line (spare line) and the signal line (data-signal line).

In the display apparatus described above (FIG. 1A and FIG. 1B), a plurality of data-signal lines S20 and S21 (only one each of S20 and S21 is shown) are led from the source driving circuits 22 and 23 and extended below the display area 21 as shown in FIG. 2A. In the periphery of the display area 21, a spare line SPL20 is formed counterclockwise, and a spare line SPL21 is formed clockwise.

In case that the spare lines SPL20 and SPL21 are connected in a region below the display area 21 (the region opposed to the source driving circuits 22 and 23 across the display area 21), there is a risk that normal signal transmission will not be performed when repairing the disconnections in data-signal lines both on right and left sides of the display area 21, which requires a disconnection process. Therefore, the spare lines SPL20 and SPL21 are prearranged separated from one another.

The display area 21 is generally formed by a liquid crystal panel having the aspect ratio of 16:9, however, it may be formed by a wide panel, for example, having the aspect ratio of 21:9. In such a case, at the central part of the panel substrate the mask exposure can be carried out by repeatedly using a certain portion of the mask (for example, a portion Q) and the spare line is formed by connecting each of the end portions of the portions of the spare line formed by the mask exposure, as shown in FIG. 2B. In this way, two or more kinds of panels having different sizes can be produced by using the same mask.

The display apparatus 24 as described above (FIG. 2B) further includes a source driving circuit 26 above the central part of the display area (display screen) 25. A plurality of data-signal lines S23 are led from the source driving circuit 26 and extended below the display area 25, and a plurality of spare lines SPL22 and a plurality of spare lines SPL23 are additionally formed above and below the display area 25, respectively (only one each of S23, SPL22, and SPL23 is shown).

However, in the display apparatus in which the exposure is carried out by repeatedly using the portion Q of the mask and the spare line is formed by connecting each of the end portions of the portions of the spare line formed by mask exposure, it is necessary to connect the respective portions, which are prearranged separated from one another, together in a region below the display area 21, while if a mask which is designed to connect the portions of the spare line together to form a spare line, as described above, is used, the spare line will be formed in the form of connected line even when a panel is produced without repeatedly using the portion Q. This will require a disconnection process for separating an unnecessary load extended beyond the melt connected portion during the repair, increasing a repair tact time. On the other hand, if a mask which is designed to prearrange the portions of the spare line separated from one another in a region below the display area 21 is used, the separated portions is not connected when the exposure is carried out by repeatedly using, for example, the aforementioned portion Q, this prevents the repair of the disconnection, resulting the deterioration of the product yield of the display panel.

SUMMARY OF THE INVENTION

The present invention has been made in view of such circumstances as mentioned above, and an object of the present invention is to provide a display apparatus which enables easy repair by using a spare line through melt connection when the exposure is carried out by repeatedly using a certain portion of the mask and the spare line is formed by connecting the portions of the spare line together in the central part of a display panel, and further enables to omit a disconnection process in which a spare line is separated even when a spare line is not formed by connecting the portions of the spare line together through the exposure with repeatedly using a portion of the mask.

The display apparatus according to an embodiment of the present invention is characterized in including: a plurality of thin-film transistors respectively provided for a plurality of pixels arranged in a matrix form in a display area of a display panel; one or more driving circuits provided at a side of one end of the display panel, each of the driving circuits providing a signal for any one or more of the plurality of thin-film transistors; a plurality of signal lines to each connect more than one of the plurality of thin-film transistors to any of the one or more driving circuits, the more than one of the plurality of thin-film transistors being arranged in one line in the matrix form; a plurality of spare lines formed to be connectable to any of the plurality of signal lines in an outer area of the display panel, the outer area being outside of the display area, and arranged separated from one another in an opposing region in the outer area, the opposing region being opposed to the driving circuits across the display area; and a metal pattern overlapping a first spare line and a second spare line among the plurality of spare lines with an insulating layer therebetween, so as to be connectable to an end portion of the first spare line arranged in a first region in the opposing region and an end portion of the second spare line arranged in a second region, different from the first region, in the opposing region.

In another embodiment of the display apparatus, the metal pattern comprises a first metal pattern overlapping the first spare line at one end portion of the first metal pattern, a second metal pattern overlapping the second spare line at one end portion of the second metal pattern, and a third metal pattern, and the other end portion of the first metal pattern and the other end portion of the second metal pattern being opposed to each other with a predetermined gap overlap the third metal pattern with an insulating layer therebetween so as to be connectable to the third metal pattern.

In yet another embodiment of the display apparatus, the other end portion of the first metal pattern and the other end portion of the second metal pattern are connected to the third metal pattern.

In yet another embodiment of the display apparatus, one end portion out of the end portion of the first spare line and the end portion of the second spare line is connected to the metal pattern.

According to the present disclosure, a display apparatus which enables easy repair by using a spare line through melt connection even when the exposure is carried out by repeatedly using a certain portion of the mask and the spare line is formed by connecting the portions of the spare line together in the central part of a display panel, and further enables to omit a disconnection process in which a spare line is separated even when a spare line is not formed by connecting the portions of the spare line together through the exposure with repeatedly using a portion of the mask can be realized. Further, a display apparatus of the present disclosure enables a repair with using a spare line only by newly preparing a source substrate to input the data signals, without changing a mask pattern, which is relatively expensive among the members to be needed, even when the exposure is carried out by repeatedly using a certain portion of the mask and the spare line is formed by connecting the portions of the spare line together in the central part of a display panel.

BRIEF DESCRIPTION OF THE DRAWINGS

FIG. 3 is a circuit diagram showing a substantial part of an example of the display apparatus.

DETAILED DESCRIPTION

Hereinbelow, several exemplary embodiments of the display apparatus according to the present disclosure will be described in terms of drawings.

Example 1

FIG. 3 shows a circuit diagram showing a substantial part of Example 1 of a display apparatus.

A display apparatus 1 includes a connection part 3, a display panel 7, a plurality of spare lines SPL1 to SPL6 (for example, the first plurality of spare lines), a plurality of spare lines SPL7 to SPL12 (for example, the second plurality of spare lines), a relay line for an input part RL, and a relay line for a non-input part rL.

A display area (display screen) 10 is formed on the display panel 7. Although not shown, in the display area 10, a plurality of data-signal lines are arranged in a vertical direction in FIG. 3 of the display panel 7, a plurality of scan-signal lines are arranged in the horizontal direction in FIG. 3 of the display panel 7, and a thin-film transistor and a pixel electrode are formed near an intersection of the data-signal line and the scan-signal line.

Figure 1A:
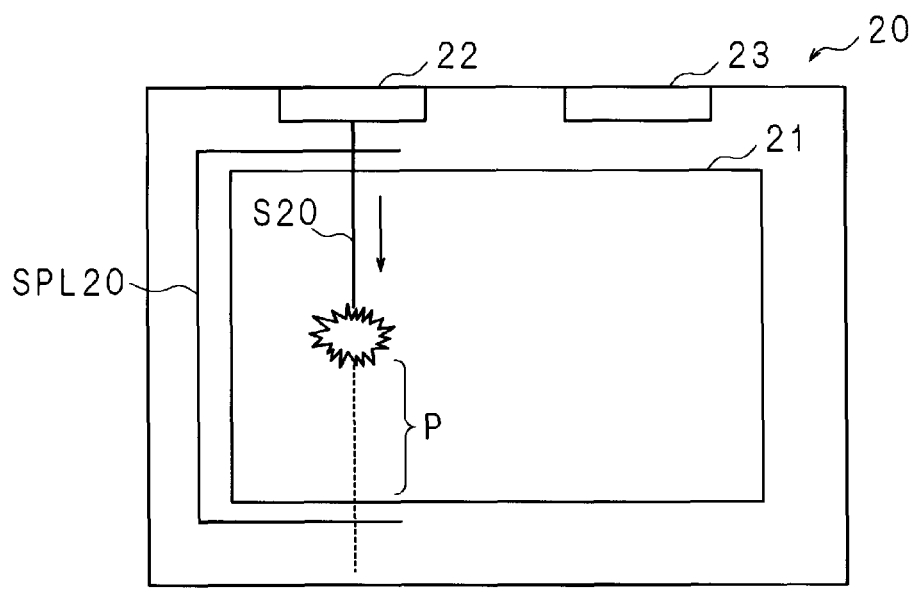
FIG. 1A is an explanatory diagram showing a method for repairing a disconnection defect in a conventional display apparatus.
Figure 1B:
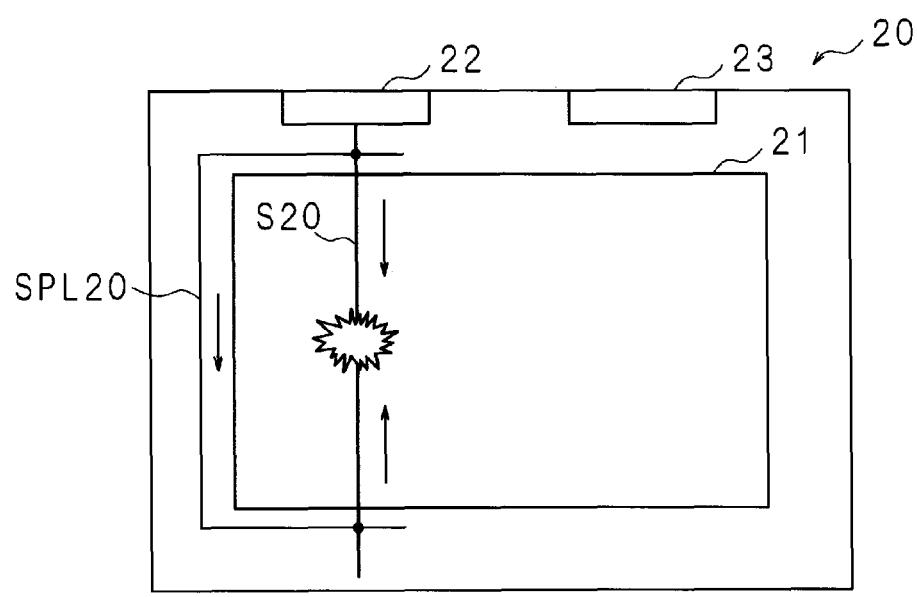
FIG. 1B is an explanatory diagram showing a method for repairing a disconnection defect in a conventional display apparatus.
Figure 2A:
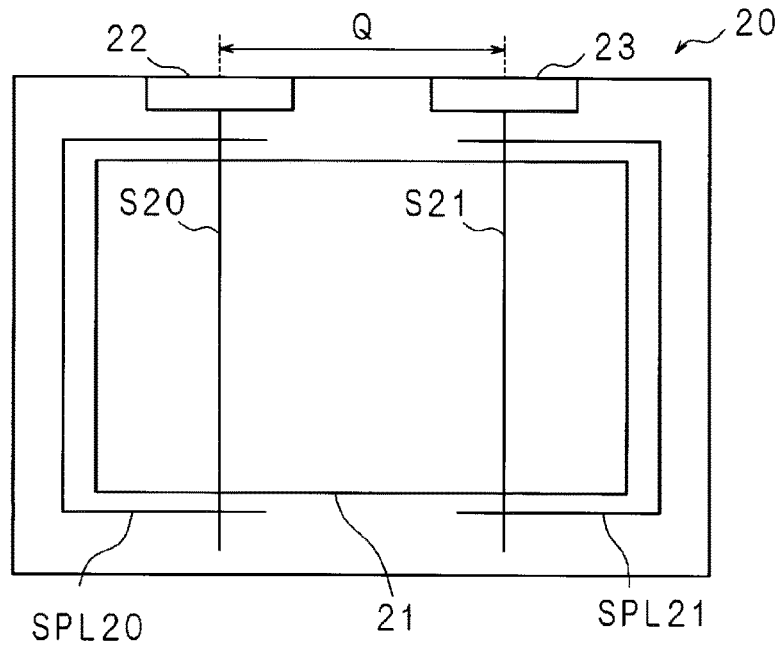
FIG. 2A is a schematic explanatory diagram showing spare lines in a conventional display apparatus.
Figure 2B:
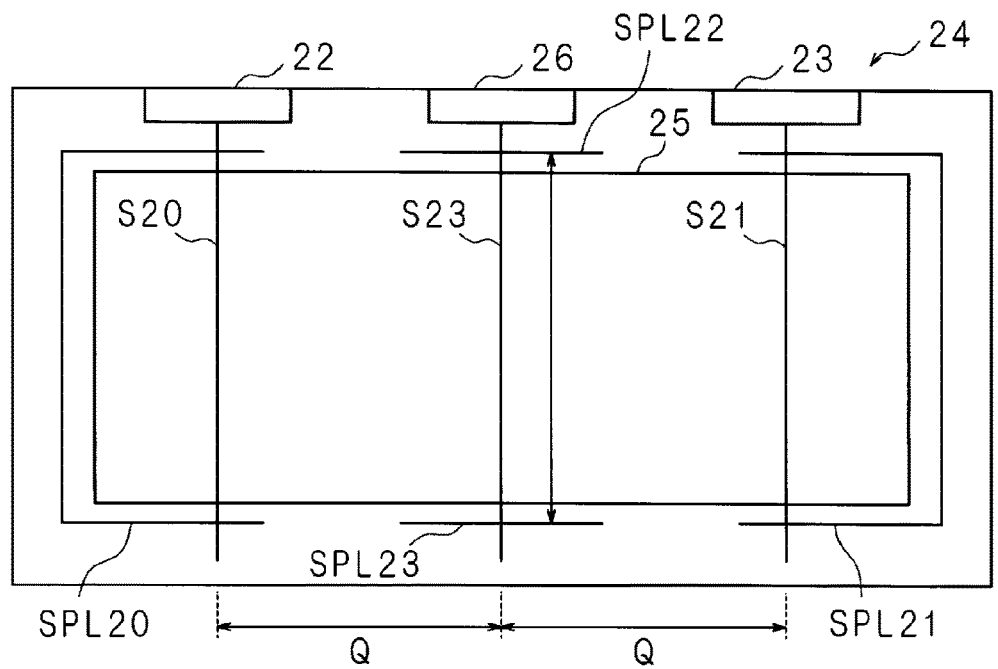
FIG. 2B is a schematic explanatory diagram showing a problem of spare lines in a conventional display apparatus.
Figure 4:
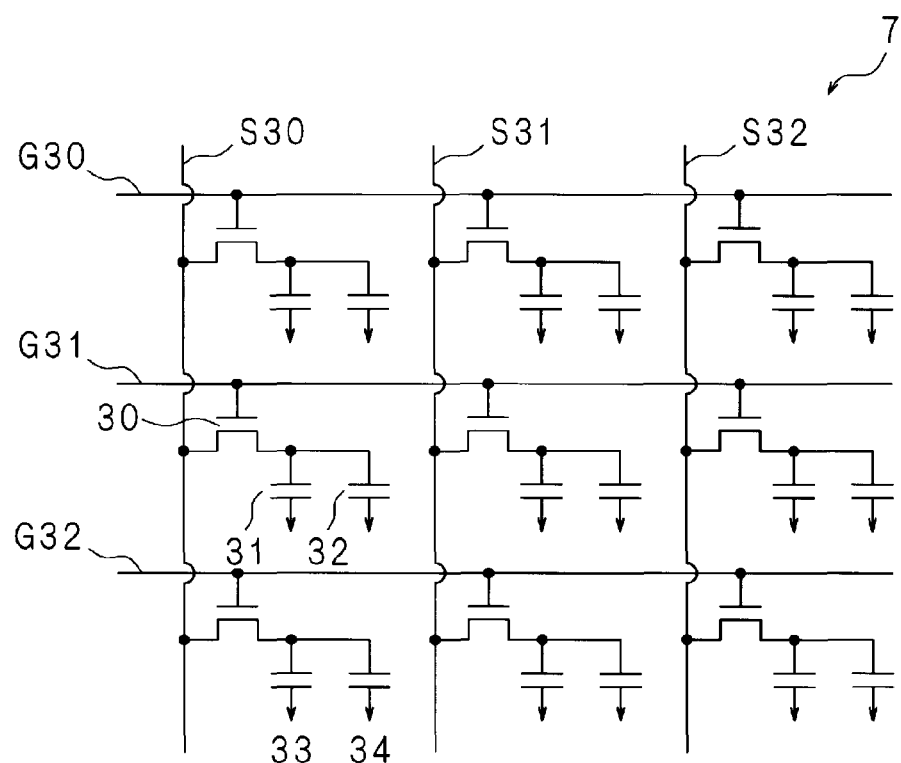
FIG. 4 is an enlarged circuit diagram showing an exemplary configuration of a display panel.

FIG. 4 is an enlarged circuit diagram showing an exemplary configuration of the display panel 7 of FIG. 3.

The display panel 7 is an active matrix driving liquid crystal panel including a thin-film transistor 30 for each pixel arranged in a matrix form. A data-signal line (signal line or source line) S30, S31, S32, . . . is connected to a source of each thin-film transistor 30 in a group of thin-film transistors 30 arranged in the vertical direction in FIG. 4 (in one line in the matrix form). Further, a scan-signal line (gate line) G30, G31, G32, . . . is connected to a gate of each thin-film transistor 30 in a group of thin-film transistors 30 arranged in scanning line direction.

A drain of each thin-film transistor 30 is connected to two electrodes, one of which constitutes a liquid crystal capacitor 31 and the other constitutes an auxiliary capacitor 32. An electrode of the liquid crystal capacitor 31 which is not connected to the thin-film transistor 30 is connected to a common electrode 33, and an electrode of the auxiliary capacitor 32 which is not connected to the thin-film transistor 30 is connected to an auxiliary capacitor electrode 34.

In this display panel 7, by applying a voltage to one scan-signal line, a group of thin-film transistors 30 connected to that scan-signal line turns to an on state. A voltage applied to the data-signal line is applied to a pixel electrode 3x and an auxiliary capacitor electrode 3y. Then a liquid crystal layer corresponding to that pixel electrode 3x transmit a display light according to the applied voltage, and simultaneously the auxiliary capacitor 32 is charged.

When charging of the liquid crystal capacitors 31 and the auxiliary capacitors 32 each arranged corresponding to one row of a scan-signal line is completed, the voltage is applied to the next scan-signal line, and a group of the thin-film transistors 30 in one row which has already turned to an on state turns to an off state by being applied a low level voltage on a gate of each thin-film transistor 30. A group of the pixel electrodes 3x in one row which has already turned to an on state can substantially maintain a necessary voltage, with an electric charge charged by the auxiliary capacitors 32 for the duration of one frame until the same scan-signal line is selected for the next time.

A source driving circuit (or driving circuits), not shown, connected to each of the data-signal lines and providing a signal for one or more of the thin-film transistors is provided at a side of one end of the display panel 7 (FIG. 3). For example, the source driving circuit may be arranged above the display panel 7. Further, a gate driving circuit not shown, connected to each of the scan-signal lines and turning on/off each of the thin-film transistors is arranged on the left or the right of the display panel 7.

Thus, in the data-signal lines without a disconnection, a data signal is transmitted from an upper part of the display panel 7 (an input part to which a data signal is input) to a lower part of the display panel 7 (a non-input part to which no data signal is normally input from the source driving circuit), while in the scan-signal line, a scan signal is transmitted either from the left to the right or from the right to the left of the display panel 7. Further, the display area 10 is divided into the regions (for example, into 12 regions) for each of the predetermined number (e.g., 960) of data-signal lines, and each of those are referred to as display blocks A to L.

A connection part 3 is provided in the upper part of the display area 10 (in the input part), and includes connection blocks a to l each corresponding respectively to each of the display blocks A to L. In each of the connection blocks a to l, a data-signal line belonging to each of the corresponding display blocks A to L is arranged, and further, two circuits each including a terminal fixed to the periphery of the display panel 7 and a buffer connected in series to the outside of the terminal are arranged in parallel.

One of the end portions, close to the input part, of each of the spare lines SPL11 to SPL12 is connected to an output terminal of the buffer provided in each of the corresponding connection blocks a to l. Further, the spare lines SPL1 to SPL12 are led along the periphery of the display area 10 in an outer area of the display panel 7, which is outside of the display area 10, (the periphery on the left side for the spare lines SPL1 to SPL6 and the periphery on the right side for the spare lines SPL7 to SPL12) to a central part below the display area 10 (corresponding to the lower part of the display panel 7 in an outer area of the display panel 7 and opposed to the source driving circuit and connection part 3 (not shown) across the display area 10).

Before repairing a disconnection (as shown in FIG. 3), a plurality of spare lines SPL1 to SPL6 on the left side (for example, the first plurality of spare lines) and a plurality of spare lines SPL7 to SPL12 on the right side (for example, the second plurality of spare lines) are arranged in a state of forming a pair (for example, SPL1 and SPL12, SPL2 and SPL11, . . . ), yet being separated from one another, in an opposing region in the outer area of the display panel 7, which is, a region Y in a central part in the lower part of the display area 10 (opposed to the driving circuit across the display area 10). As described below, a plurality of spare lines SPL1 to SPL12 are formed to be connectable to any of the plurality of data-signal lines S30, S31, S32, . . . in the outer area of the display panel 7.

A relay line for an input part RL is arranged between the display area 10 and the connection part 3. Specifically, two relay lines for an input part RL in the horizontal direction are provided for every two connection blocks and in parallel between the two adjoining display blocks and the two connection blocks corresponding to the two adjoining display blocks. One of the two relay lines for an input part is connected to a terminal of one of the connection blocks, and the other is connected to a terminal of the other connection block.

This enables to repair two data-signal lines among the plurality of data-signal lines belonging to the two display blocks, so that a maximum of twelve data-signal lines can be repaired in total.

Even in the case where two disconnections occur within one display block, the disconnections can be repaired. For example, the relay lines for an input part RL1 and RL2 in the horizontal direction are provided in parallel between the adjoining display blocks E and F and the adjoining connection blocks e and f, and the relay line for an input part RL1 is connected to the respective terminals of the connection block f while the relay line for an input part RL2 is connected to the respective terminals of the connection block e.

Further, an inverted L-shaped relay line for a non-input part rL, in which one linear portion of the inverted L-shaped relay line is in the direction of the data-signal lines, and the other is provided along the direction of the scan-signal lines between the spare line SPL1 or SPL12 and one of the display blocks A to L, is arranged in a region below the display blocks A to L (the opposing region in the outer area of the display panel 7 opposed to the connection part 3 across the display area 10).

It should be noted that a relay line for a non-input part rL is shown in the modified form in FIG. 3 for illustrative purposes. In the presently illustrated embodiment, the linear portion of the relay line for a non-input part rL in the direction of the data-signal lines is shorter than the one provided along the direction of the scan-signal lines. In other words, each relay line for a non-input part rL has a long portion provided along in the direction of the scan-signal lines and a short portion in the direction of the data-signal lines.

Figure 5:
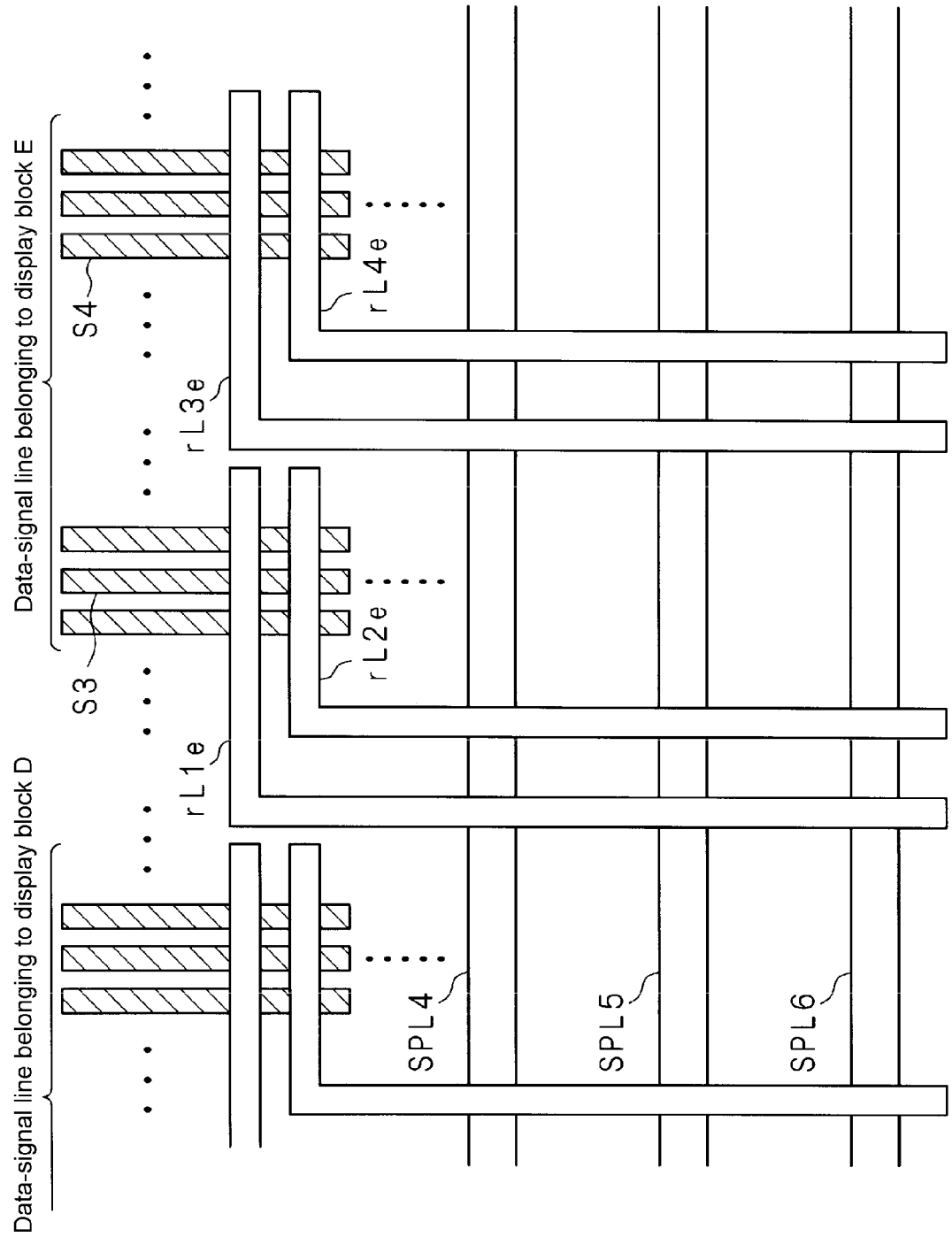
FIG. 5 is schematic enlarged view of an exemplary configuration of a region X in FIG. 3.

FIG. 5 is a schematic enlarged view of an exemplary configuration of a region X in FIG. 3.

In the region X, four inverted L-shaped relay lines for a non-input part rL1e to rL4e are arranged in the order of a larger inverted L-shaped relay line rL1e, a smaller inverted L-shaped relay line rL2e, a larger inverted L-shaped relay line rL3e, and a smaller inverted L-shaped relay line rL4e from left to right in the direction of the scan-signal lines below the display block E.

Each data-signal line belonging to the display block E is arranged crossing the respective linear portions (longer portions, that is, the ones in the horizontal direction in FIG. 5) of two of the relay lines for a non-input part rL1e to rL4e with an insulating layer (not shown) between. Further, the other portions (the short portions, that is, the ones in the vertical direction in FIG. 5) of the relay lines for a non-input part rL1e to rL4e are arranged crossing the six spare lines SPL1 to SPL6 arranged in the horizontal direction with an insulating layer (not shown) between. (In FIG. 5, only portions of the spare lines SPL4 to SPL6 are illustrated.)

As with the data-signal lines belonging to the display block E, the data-signal lines belonging to each of the display blocks A to L in FIG. 3 are arranged crossing two of the four relay lines for a non-input part rL1x to rL4x corresponding to each of the display blocks A to L with an insulating layer between. Further, as with the embodiment shown in FIG. 5, the spare lines SPL1 to SPL6 are arranged crossing four relay lines for a non-input part rL1x to rL4x arranged corresponding to each of the display blocks A to F with an insulating layer between, and the spare lines SPL7 to SPL12 are arranged crossing four relay lines for a non-input part rL1x to rL4x arranged corresponding to each of the display blocks G to L with an insulating layer between.

Figure 6:
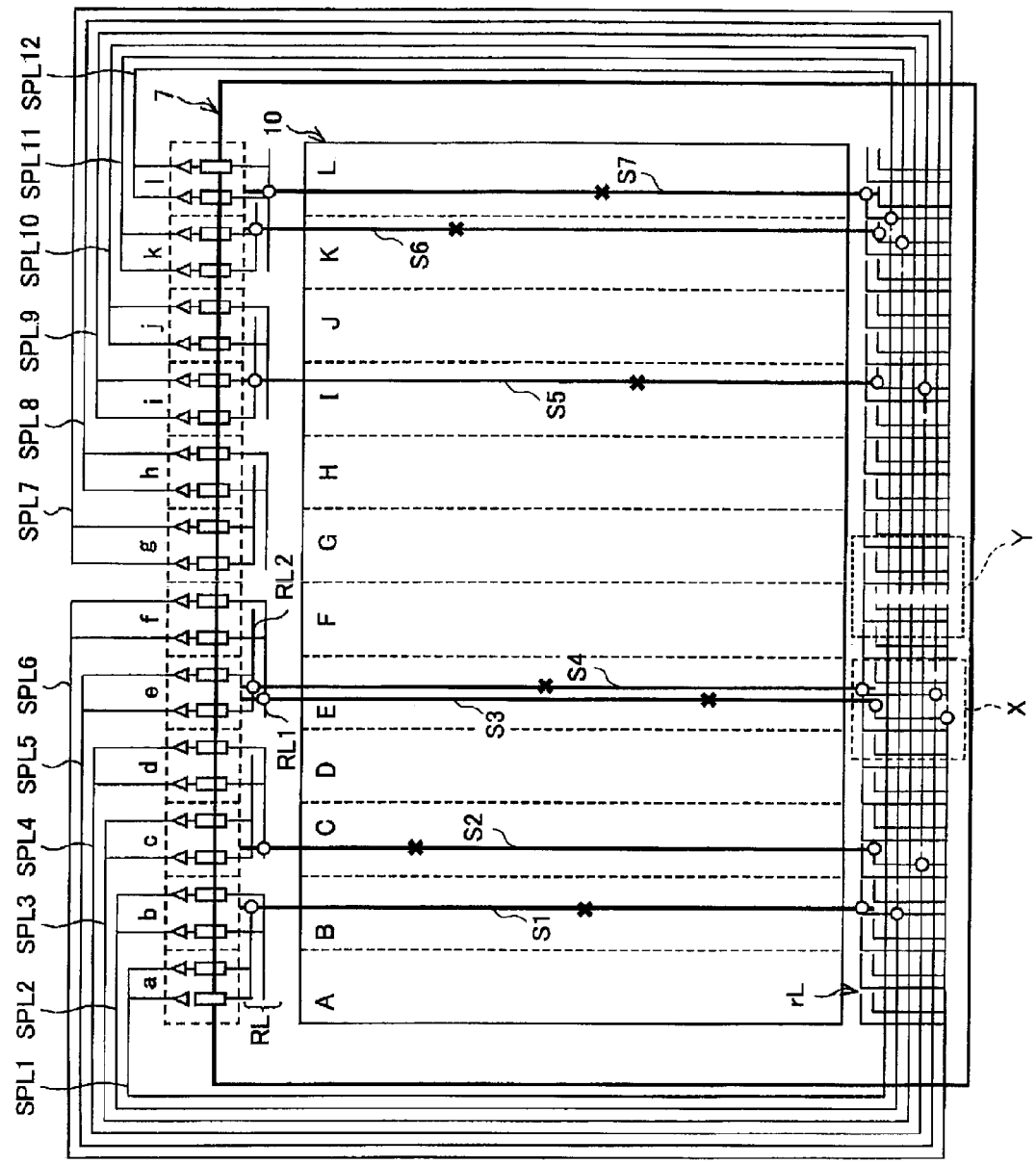
FIG. 6 is an explanatory diagram showing examples of repairs of disconnected data-signal lines in FIG. 3 and FIG. 5.
Figure 7:
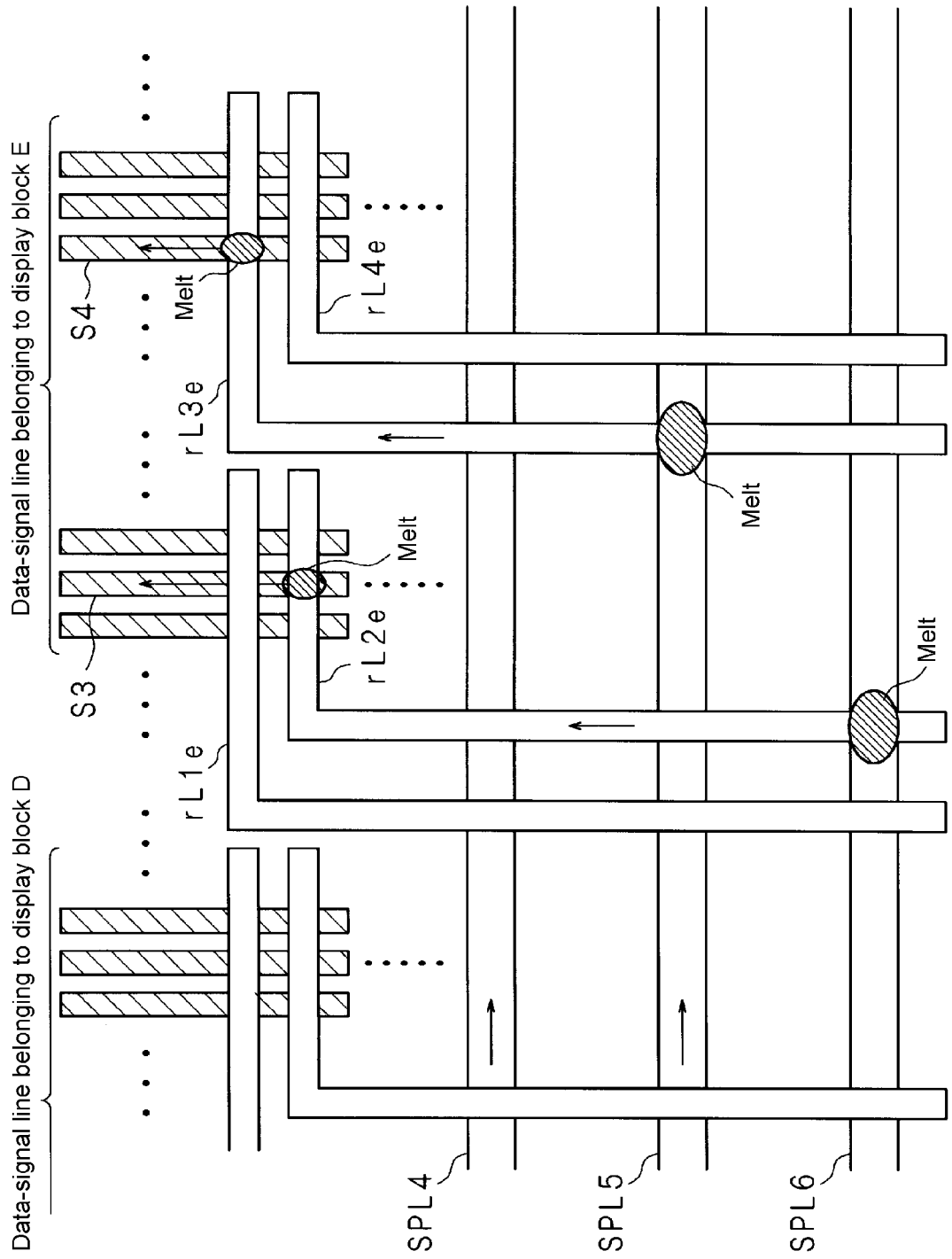
FIG. 7 is an explanatory diagram showing examples of repairs of disconnected data-signal lines in FIG. 3 and FIG. 5.

FIG. 6 and FIG. 7 are explanatory diagrams showing examples of repairs of data-signal lines when a disconnection occurs in FIG. 3 or FIG. 5.

Although only repairs of disconnections in data-signal lines S3 and S4 are described below, it should be appreciated that the other data-signal lines S1, S2, S5, S6, and S7 can also be repaired in a similar manner. Further, although each relay line for a non-input part rL is shown in the modified form in FIGS. 3, 5, 6, and 7 for illustrative purposes, the linear portion of the relay line for a non-input part rL provided along the direction of the data-signal lines may be shorter than the one provided along the direction of the scan-signal lines. Hereinbelow, a method for repairing data-signal lines S3 and S4 is explained on the premise that the linear portions provided along the direction of the data-signal lines are shorter than the ones provided along the direction of the scan-signal lines.

A data-signal line in which a disconnection (the position of which is indicated by X) occurs is connected to a spare line via a relay line for an input part RL in the region between the display area 10 and the connection portion 3.

For example, the data-signal line S3 in which a disconnection occurs may be melt connected to the relay line for an input part RL1 by using laser. The data-signal line S4 in which a disconnection occurs may be melt connected to the relay line for an input part RL2 by using laser.

Further, an end part close to the non-input part (a terminal part) of the data-signal line in which a disconnection occurs is connected to a spare line via a relay line for a non-input part rL in a region below the display area 10.

For example, a terminal part of the data-signal line S3 in which a disconnection occurs may be melt connected to a linear portion (a long portion, the one arranged in the horizontal direction in FIG. 7) of the relay line for a non-input part rL2e by using laser, and the other portion (the short portion, the one arranged in the vertical direction in FIG. 7) of the relay line for a non-input part rL2e may be melt connected to the spare line SPL6 by using laser.

Further, a terminal part of the data-signal line S4 in which disconnection occurs may be melt connected to a linear portion (a long portion, the one arranged in the horizontal direction in FIG. 7) of the relay line for a non-input part rL3e by using laser, and the other portion (the short portion, the one arranged in the vertical direction in FIG. 7) of the relay line for a non-input part rL3e may be melt connected to the spare line SPL5 by using laser.

This enables to apply a signal voltage to a part of the data-signal line S3 which extends beyond the position of disconnection, through the one of the relay lines for an input part, RL1, corresponding to the display blocks E and F, the terminals and buffers of the connection block f, the spare line SPL6, and the relay line for a non-input part rL2e. As a result, the display defect caused by a disconnection can be eliminated.

Further, this enables to apply a signal voltage to a part of the data-signal line S4 which extends beyond the position of disconnection, through the other of the relay lines for an input part, RL2, corresponding to the display blocks E and F, the terminals and buffers of the connection block e, the spare line SPL5, and the relay line for a non-input part rL3e. As a result, the display defect caused by a disconnection can be eliminated.

Figure 8:
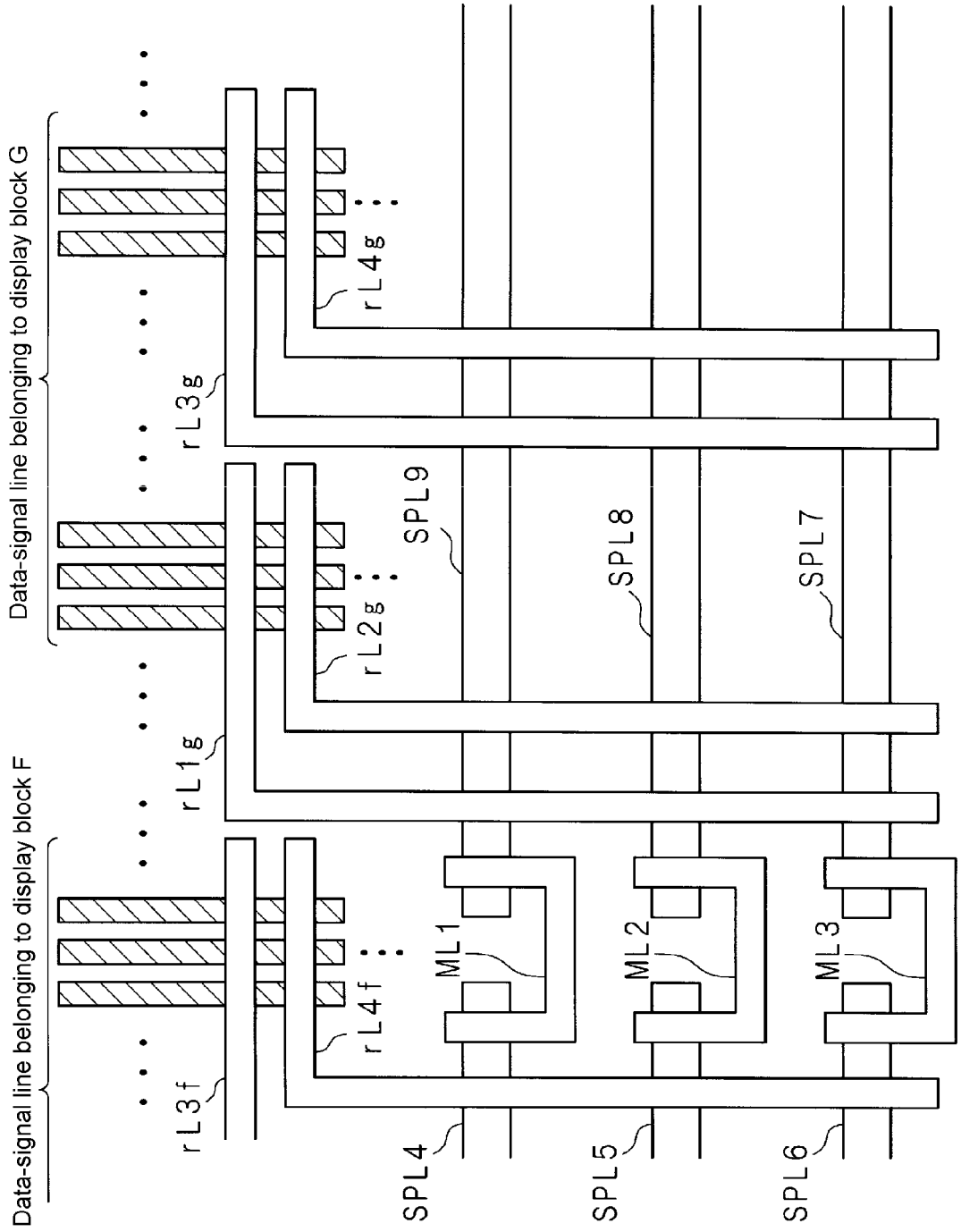
FIG. 8 is a schematic enlarged view of an exemplary configuration of a region Y in FIG. 3.

FIG. 8 is a schematic enlarged view of an exemplary configuration of a region Y in FIG. 3.

In the region Y, six inverted L-shaped relay lines for a non-input part rL3f, rL4f, and rL1g to rL4g are arranged in the order of a larger inverted L-shaped relay line rL3f, a smaller inverted L-shaped relay line rL4f, a larger inverted L-shaped rL1g, a smaller inverted L-shaped relay line rL2g, a larger inverted L-shaped relay line rL3g, and a smaller inverted L-shaped relay line rL4g from left to right in the direction of the scan-signal lines below the display blocks F and G.

Each data-signal line belonging to the display block G is arranged crossing the respective linear portions (longer portions, that is, the ones in the horizontal direction in FIG.

8) of two of the relay lines for a non-input part rL1g to rL4g with an insulating layer (not shown) between, and each data-signal line belonging to the right half of the display block F is arranged crossing the respective linear portions (longer portions, that is, the ones in the horizontal direction in FIG. 8) of the relay lines for a non-input part rL3f and rL4f with an insulating layer (not shown) between.

Further, the other portions (the short portions, that is, the ones in the vertical direction in FIG. 8) of the relay lines for a non-input part rL3f and rL4f are arranged crossing the six spare lines SPL1 to SPL6 arranged in the horizontal direction with an insulating layer (not shown) between. (In FIG. 8, only portions of the spare lines SPL4 to SPL6 are illustrated.) Further, the other portions (the short portions, that is, the ones in the vertical direction in FIG. 8) of the relay lines for a non-input part rL1g to rL4g are arranged crossing the six spare lines SPL12 to SPL7 arranged in the horizontal direction with an insulating layer (not shown) between. (In FIG. 8, only portions of the spare lines SPL9 to SPL7 are illustrated.)

Six of the spare lines SPL1 to SPL6 (for example, the first spare lines) and six of the spare lines SPL7 to SPL12 (for example, the second spare lines) are arranged in a state of forming pairs of SPL1 and SPL12, SPL2 and SPL11, SPL3 and SPL10, SPL4 and SPL9, SPL5 and SPL8, and SPL6 and SPL7), yet being separated from one another, in a region below the display block F (the opposing region in the outer area of the display panel 7 being opposed to the driving circuit (not shown) across the display area 10 and in an outer area of the display panel 7, which is outside of the display area (display screen) 10).

When the spare lines SPL4 to SPL9 are formed, for example, in a gate metal layer, spare lines SPL4 and SPL9, spare lines SPL5 and SPL8, and spare lines SPL6 and SPL7, each of which is respectively formed being separated from one another, overlap a source metal layer having metal patterns ML1, ML2, and ML3 with an insulating layer (not shown) between. In particular, each of the metal patterns ML1, ML2, and ML3 is formed to overlap each of one of the end portions of spare lines SPL4 to SPL6 (for example, the first spare line), respectively, and each of one of the end portions of spare lines SPL9 to SPL7 (for example, the second spare line), respectively, such that each of the metal patterns ML1, ML2, and ML3 can be connected to each of one of the end portions of spare lines SPL4 to SPL6 arranged in a first region (for example, the left region in FIG. 3) of the opposing region being opposed to the driving circuit (not shown) and in the outer area of the display panel 7, which is outside of the display area 10, and each of one of the end portions of spare lines SPL9 to SPL7 arranged in a second region, different from the first region, (for example, the right region in FIG. 3). In the embodiment illustrated in FIG. 8, each of the metal patterns ML1, ML2, and ML3 crosses each of the spare lines SPL4 to SPL6, respectively, and each of the spare lines SPL9 to SPL7, respectively.

Although not shown in FIG. 8, spare lines SPL1 and SPL12, spare lines SPL2 and SPL11, and spare lines SPL3 and SPL10 may also each overlap (for example, cross), for example, metal patterns in the source metal layer with an insulating layer between.

This configuration of the display apparatus 1 allows to repair a disconnection by using spare lines, in which, according to a disconnection condition of the data-signal line, spare lines SPL4 and SPL9, spare lines SPL5 and SPL8, and spare lines SPL6 and SPL7 are respectively connected to the metal patterns ML1, ML2 and ML3 and further a spare line is melt connected to a relay line for a non-input part, even when the exposure is carried out by repeatedly using a certain portion of the mask and the spare line is formed by connecting the portions of the spare line together in the central part of a display panel. Further, it enables to omit a disconnection process even when a spare line is not formed by connecting the portions of the spare line together through the repeated exposure.

Figure 9:
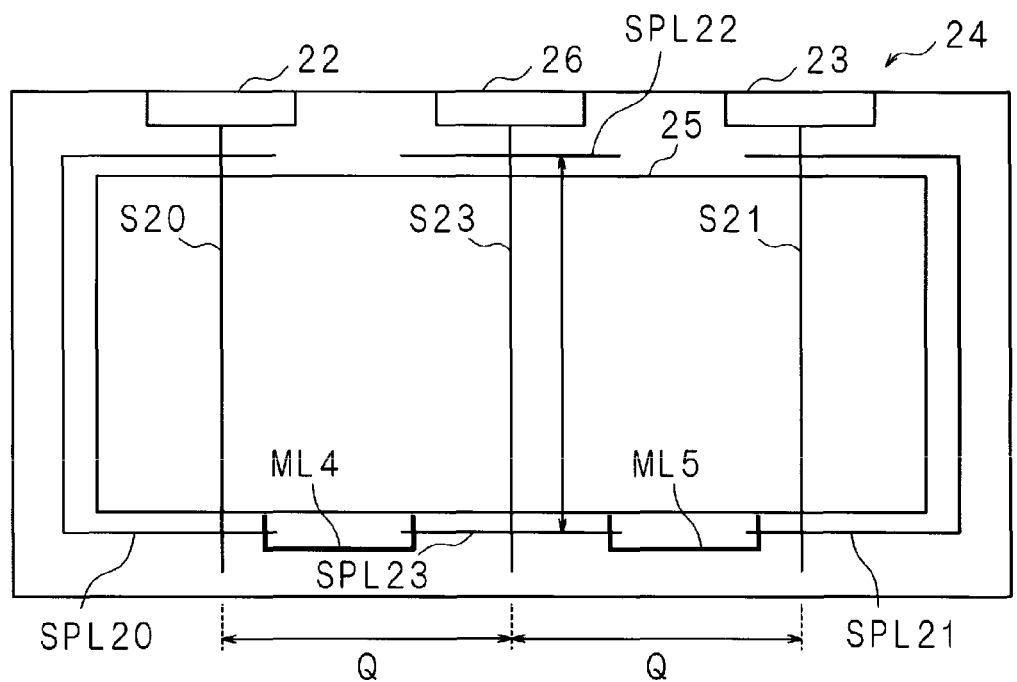
FIG. 9 is a schematic explanatory diagram showing an exemplary effect of the display apparatus.

FIG. 9 is a schematic explanatory diagram showing an exemplary effect of the presently illustrated embodiment of the display apparatus.

In this exemplary embodiment of display apparatus 24, the central part of the display area (display screen) 25 is formed by an exposure carried out by repeatedly using a certain portion of the mask (for example, a portion Q), and a plurality of data-signal lines (only S20 and S21 are shown) are led from the source driving circuits (driving circuits) 22 and 23 and extended below the display area 25.

Further, in this exemplary embodiment of display apparatus 24, in the outer area of the display panel, which is outside of the display area 25, the spare line SPL20 is formed counterclockwise, the spare line SPL21 is formed clockwise, and the source driving circuit (driving circuit) 26 is provided above the central part of the display area 25.

Further, in this exemplary embodiment of the display apparatus 24, a plurality of data-signal lines (only S23 is shown) are led from the source driving circuits 26 and extended below the display area 25, and the spare lines SPL22 and SPL23 are respectively formed above and below the display area 25. Although only one spare line is shown for each of the spare lines SPL20, SPL21, SPL22, and SPL23, a plurality of spare lines may be formed for each of the spare lines SPL20, SPL21, SPL22, and SPL23.

As with the configuration in FIG. 8, a spare line SPL20 (for example, the first spare line), which is formed counter-clockwise, and a spare line SPL23 (the second spare line, when the spare line SPL20 is the first spare line), which is formed below the display area 25 overlap or cross a metal pattern ML4 in the source metal layer with an insulating layer (not shown) between, and a spare line SPL21 (for example, the second spare line), which is formed clockwise, and a spare line SPL23 (the first spare line, when the spare line SPL21 is the second spare line), overlap or cross a metal pattern ML5 in the source metal layer with an insulating layer (not shown) between. In FIG. 9, a relay line for an input part and a relay line for a non-input part are not shown. In addition, although not shown, the spare line SPL22 and the spare line SPL20 or SPL21 may also be connected with a metal pattern (not shown), for example, in the source metal layer.

This configuration of the display apparatus 24, in which the spare line is formed by connecting the portions of the spare line together in the central part of a display area 25 through an exposure with repeatedly using a certain portion of the mask, enables an easy repair by using a spare line through melt connection of each of the spare lines SPL20, SPL21, and SPL23 to each of the metal patterns ML4 and ML5, respectively, according to a disconnection condition of the data-signal line.

Example 2

Figure 10:
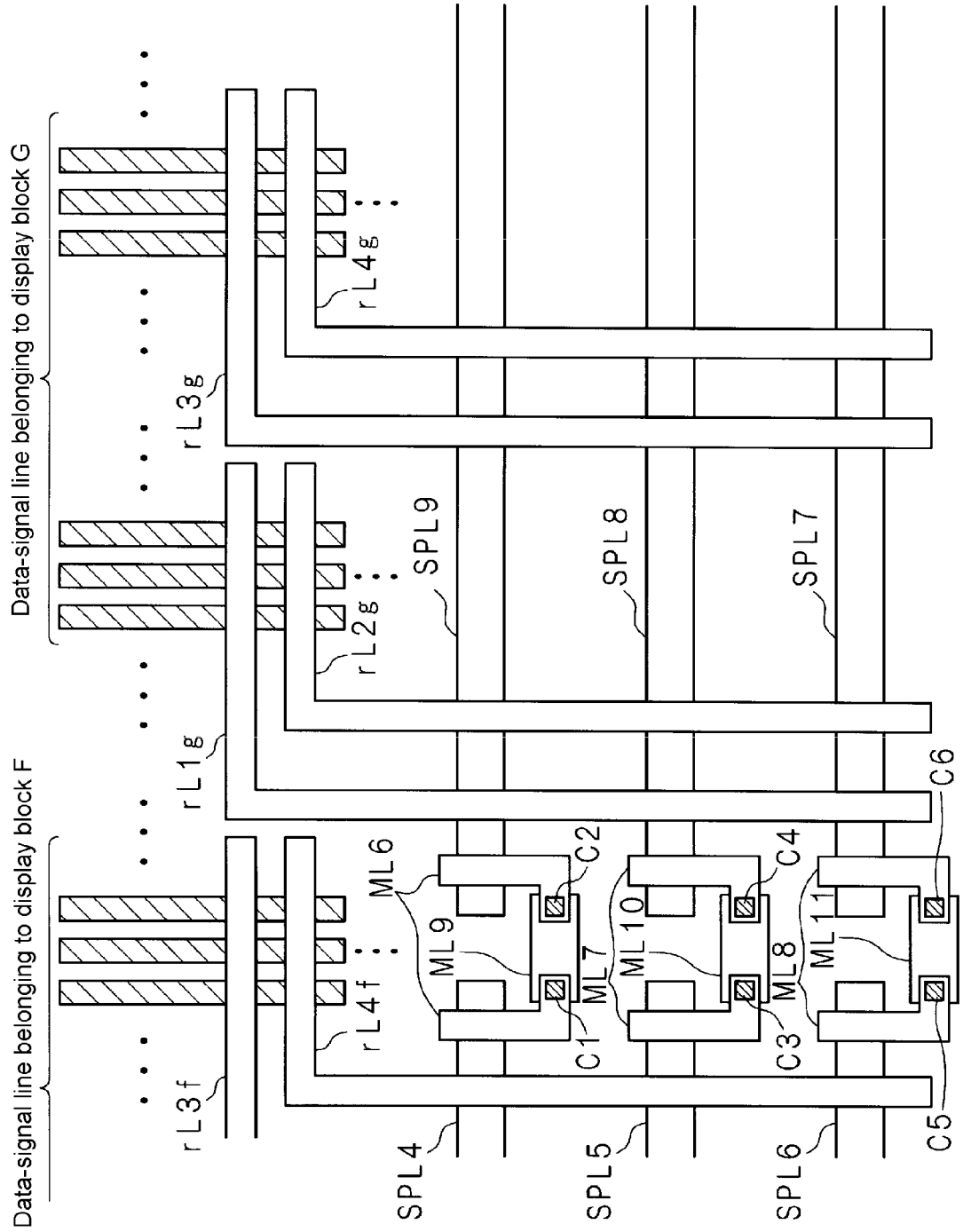
FIG. 10 is a schematic enlarged view showing an exemplary embodiment of the display apparatus, including a part defined by each spare lines separated from one another.

FIG. 10 is a schematic enlarged view showing an exemplary embodiment of the display apparatus in Example 2, including a part defined by each spare lines separated from one another.

The part defined by each of the spare lines separated from one another corresponds to the region Y in Example 1 in FIG. 3, and a configuration of the relay lines for a non-input part rL3f, rL4f, and rL1g to rL4g and the spare lines SPL1 to SPL6 and SPL12 to SPL7 is similar to the configuration illustrated in FIG. 8.

When the spare lines SPL4 to SPL9 are formed, for example, in a gate metal layer, two spare lines, the one of spare lines SPL4 to SPL6 (for example, the first spare line) and the one of spare lines SPL9 to SPL7 (for example, the second spare line), which are formed being separated from one another, overlap or cross respectively the one of metal patterns ML6, ML7, and ML8 in a source metal layer with an insulating layer (not shown) between. Further, each of the metal patterns ML6, ML7, and ML8, which overlaps the spare lines SPL4 to SPL9, is separated into two parts (first metal pattern and second metal pattern) in an intermediate part and forms a separate part. The first metal pattern overlaps the first spare line (for example, the spare line SPL4) at one end portion of the first metal pattern, and the second metal pattern overlaps the second spare line (for example, the spare line SPL9) at one end portion of the second metal pattern. The other end portion of the first metal pattern and the other end portion of the second metal pattern are opposed each other across the separate part with a predetermined gap, and overlap a third metal pattern (for example, metal pattern ML9) in another metal layer (for example, a gate metal layer) with an insulating layer (not shown) between so as to be connectable to the metal pattern ML9. The other end portion of the first metal pattern and the other end portion of the second metal pattern are connected to the metal pattern ML9 through a contact C1 and a contact C2. The first metal pattern and the second metal pattern (the metal pattern ML6) may cross the metal pattern ML9.

Similarly, both of the end portions produced by separation of the metal pattern ML7 overlap a metal pattern ML10 in the gate metal layer with an insulating layer (not shown) between, and are connected to the metal pattern ML10 through a contact C3 and a contact C4. Both of the end portions produced by separation of the metal pattern ML8 overlap a metal pattern ML11 in the gate metal layer with an insulating layer (not shown) between, and are connected to the metal pattern ML11 through a contact C5 and a contact C6. The metal pattern ML7 and the metal pattern ML8 may cross over the metal pattern ML10 and the metal pattern ML11, respectively.

This configuration enables, when the gate metal layer has a resistance lower than that of the source metal layer, to connect two spare lines (the first spare line and second spare line), which are separated from one another, to each other through a path having a lower resistance by melt connecting the two spare lines to the metal pattern comprising the metal pattern, which is arranged in the gate metal layer, in the separate part. Other structures and effects in Example 2 are similar to those of the display apparatus described in Example 1, for which detailed explanations will be omitted.

Example 3

Figure 11:
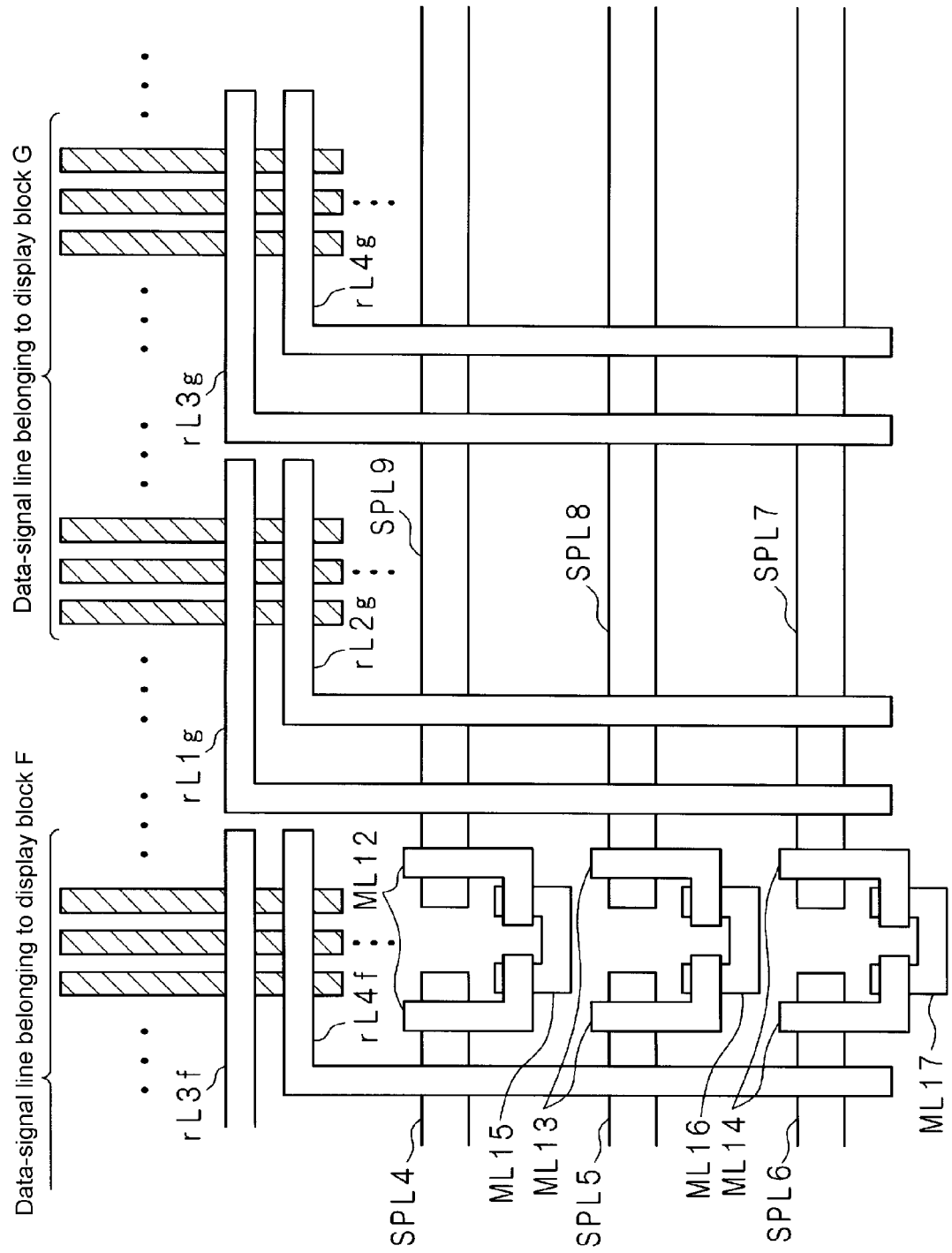
FIG. 11 is a schematic enlarged view showing an exemplary embodiment of the display apparatus, including a part defined by each spare lines separated from one another.

FIG. 11 is a schematic enlarged view showing an exemplary embodiment of the display apparatus in Example 3, including a part defined by each spare lines separated from one another.

The part defined by each of the spare lines separated from one another corresponds to the region Y in Example 1 in FIG. 3, and a configuration of the relay lines for a non-input part rL3f, rL4f, and rL1g to rL4g and the spare lines SPL1 to SPL6 and SPL12 to SPL7 is similar to the configuration illustrated in FIG. 8.

When the spare lines SPL4 to SPL9 are formed, for example, in a gate metal layer, two spare lines, the one of spare lines SPL4 to SPL6 (for example, the first spare line) and the one of spare lines SPL9 to SPL7 (for example, the second spare line), which are formed being separated from one another, overlap or cross respectively the one of metal patterns ML12, ML13, and ML14 in a source metal layer with an insulating layer (not shown) between.

Further, each of the metal patterns ML12, ML13, and ML14 is separated into two parts (first metal pattern and second metal pattern) in an intermediate part and forms a separate part. The first metal pattern overlaps the first spare line (for example, the spare line SPL4) at one end portion of the first metal pattern, and the second metal pattern overlaps the second spare line (for example, the spare line SPL9) at one end portion of the second metal pattern. The other end portion of the first metal pattern and the other end portion of the second metal pattern are opposed each other across the separate part with a predetermined gap, and overlap a third metal pattern (for example, metal pattern ML15) in another metal layer (for example, a gate metal layer) with an insulating layer (not shown) between so as to be connectable to the metal pattern ML15. In the exemplary example shown in FIG. 11, the other end portion of the first metal pattern and the other end portion of the second metal pattern cross the metal pattern ML15.

Similarly, both of the end portions produced by separation of the metal pattern ML13 overlap or cross a metal pattern ML16 in the gate metal layer with an insulating layer (not shown) between, and both of the end portions produced by separation of the metal pattern ML14 overlap or cross a metal pattern ML17 in the gate metal layer with an insulating layer (not shown) between.

This configuration can provide a path having a lower resistance between two spare lines, when the gate metal layer has a resistance lower than that of the source metal layer, by melt connecting the metal pattern arranged in the gate metal layer (for example metal pattern ML16), to, for example, the metal pattern ML13, and further, by melt connecting the two spare lines (the first spare line and second spare line), which are separated from one another, to, for example, the metal pattern ML13. Other structures and effects in Example 3 are similar to those of the display apparatus described in Example 1, for which detailed explanations will be omitted.

Example 4

Figure 12:
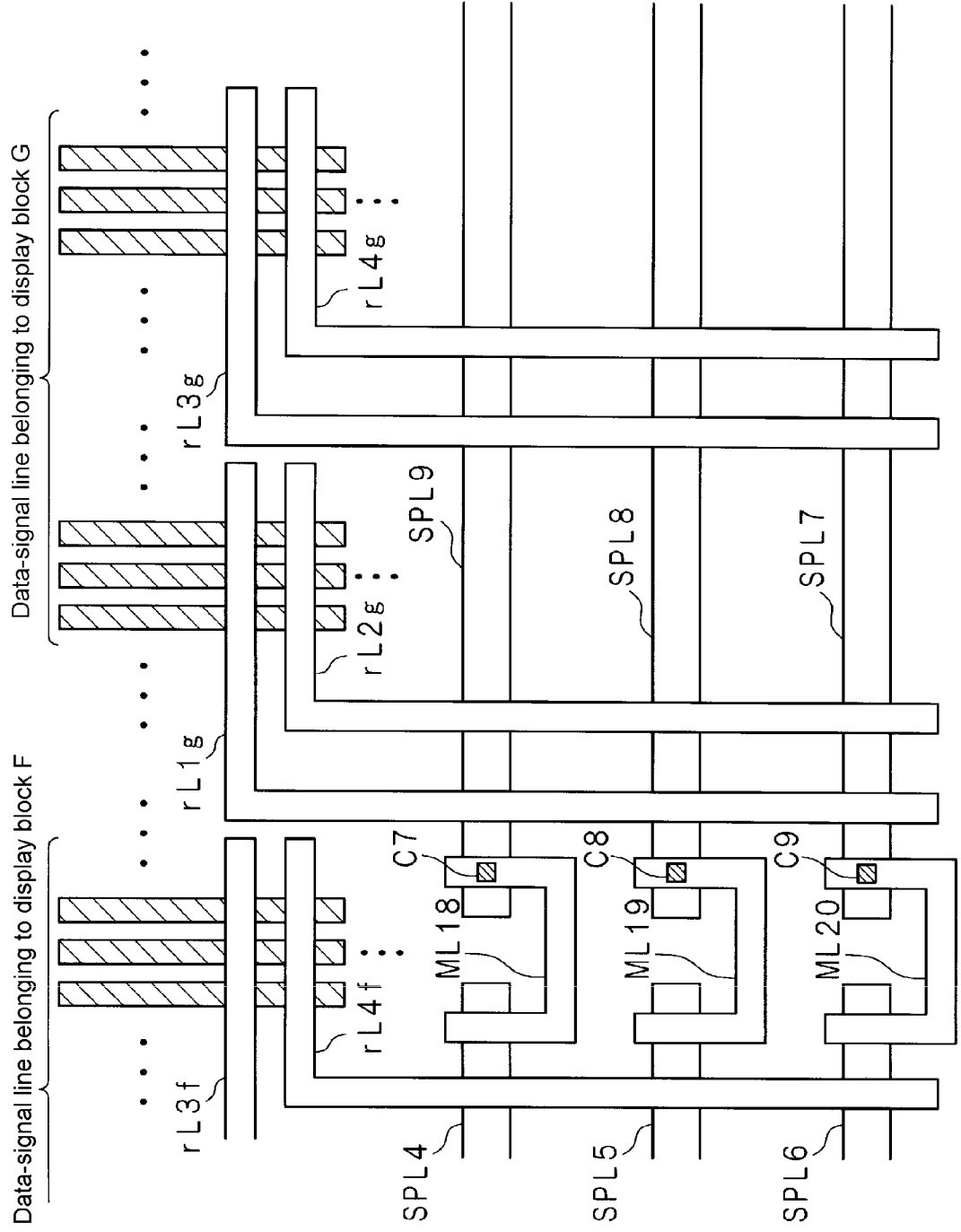
FIG. 12 is a schematic enlarged view showing an exemplary embodiment of the display apparatus, including a part defined by each spare lines separated from one another.

FIG. 12 is a schematic enlarged view showing an exemplary embodiment of the display apparatus in Example 4, including a part defined by each spare lines separated from one another.

The part defined by each of the spare lines separated from one another corresponds to the region Y in Example 1 in FIG. 3, and a configuration of the relay lines for a non-input part rL3f, rL4f, and rL1g to rL4g and the spare lines SPL1 to SPL6 and SPL12 to SPL7 is similar to the configuration illustrated in FIG. 8.

When the spare lines SPL4 to SPL9 are formed, for example, in a gate metal layer, two spare lines, the one of spare lines SPL4 to SPL6 (for example, the first spare line) and the one of spare lines SPL9 to SPL7 (for example, the second spare line), which are formed being separated from one another, overlap or cross respectively the one of metal patterns ML18, ML19, and ML20 in a source metal layer with an insulating layer (not shown) between. Further, one of the end portions of each of the metal patterns ML18, ML19, and ML20 and each of the end portions of the spare lines SPL9, SPL8, and SPL7 are respectively overlapped or crossed each other with an insulating layer (not shown) between and are connected through a contact C7, a contact C8, and a contact C9, respectively.

Possibility of impediment of proper transmission of data signals by leakage can be suppressed at the positions where the melt connection is not necessary (the connection is not necessary), in the configuration in which two positions are formed to be melt connected, as described in Example 1, in repairing by using the spare line.

However, in the case where the possibility of occurrence of leakage at the crossing position, which is not melt connected, is sufficiently low, it may be advantageous to prioritize a work efficiency in the repairing process by using the spare line, by connecting in advance each of the end portions of the metal patterns ML18, ML19, and ML20 to each of the end portions of the spare lines SPL9, SPL9, and SPL10 (for example, the second spare line), respectively, through the contact C7, the contact C8, and the contact C9, respectively. Alternatively, unlike the example of FIG. 12, each of the end portions of the metal patterns ML18 to ML20 close to the spare lines SPL4 to SPL6 (for example, the first spare line) may be connected to each of the end portions of the spare line SPL4 to SPL6, respectively, through a contact (not shown). Other structures and effects are similar to those of the display apparatus described in Example 1, for which detailed explanations will be omitted.

It should be appreciated that the disclosed embodiments in Examples 1, 2, 3, and 4 in this specification are intended to be illustrative and not restrictive in all respects. The scope of the display apparatus of the present disclosure is not limited to the above-described context, and the meaning equivalent to the claims and all modifications within the scope of the claims are intended to be included.

INDUSTRIAL APPLICABILITY

The display apparatus according to the present disclosure can be utilized, for example, in television receivers, and display apparatus for computers, mobile terminals, and others.

What is claimed is:

1. A display apparatus comprising:
a plurality of thin-film transistors respectively provided for a plurality of pixels arranged in a matrix form in a display area of a display panel;
one or more driving circuits provided at a side of one end of the display panel, each of the driving circuits providing a signal for at least one of the plurality of thin-film transistors;
a plurality of signal lines, wherein each of the plurality of signal lines connects more than one of the plurality of thin-film transistors to any of the one or more driving circuits, the more than one of the plurality of thin-film transistors being arranged in one line in the matrix form; and
a plurality of spare lines formed to be connectable to any of the plurality of signal lines in an outer area of the display panel, the outer area being outside of the display area;
wherein the plurality of spare lines comprises a first spare line and a second spare line,
the first spare line extends from the one end of the display panel, and extends in an extending direction in an opposing region of the display panel and comprises a first end portion in the opposing region, the first end portion being an end portion in the extending direction, wherein the opposing region is opposed to the driving circuits across the display area, and the extending direction is along an end of the display panel being opposed to the one end in the display panel, and
the second spare line extends in the extending direction in the opposing region and comprises a second end portion in the opposing region, the second end portion being an end portion in the extending direction, and
with respect to a direction that is orthogonal to the extending direction in a top view of the display panel, the first spare line and the second spare line are not overlapping in the opposing region, and the first end portion and the second end portion are opposed to each other in the extending direction with a predetermined gap being between the first end portion and the second end portion in the extending direction,
the display apparatus further comprising
a metal pattern overlapping the first end portion of the first spare line and the second end portion of the second spare line with an insulating layer between the metal pattern and each of the first end portion and the second end portion, so as to be connectable to the first end portion and the second end portion.

2. The display apparatus according to claim 1, wherein the metal pattern comprises a first metal pattern overlapping the first spare line at one end portion of the first metal pattern, a second metal pattern overlapping the second spare line at one end portion of the second metal pattern, and a third metal pattern,
a first opposite end portion of the first metal pattern and a second opposite end portion of the second metal pattern overlap the third metal pattern with an insulating layer between the third metal pattern and each of the first metal pattern and the second metal pattern so as to be connectable to the third metal pattern, the first opposite end portion being opposite the one end portion of the first metal pattern and the second opposite end portion being opposite the one end portion of the second metal pattern, and
the first opposite end portion and the second opposite end portion are opposed to each other with a predetermined gap.

3. The display apparatus according to claim 2, wherein the first opposite end portion and the second opposite end portion are connected to the third metal pattern.

4. The display apparatus according to claim 1, wherein either the first end portion of the first spare line or the second end portion of the second spare line is connected to the metal pattern.

5. The display apparatus according to claim 1, further comprising a plurality of relay lines arranged in the opposing region so as to be connectable to the plurality of spare lines and the any of the plurality of signal lines, a first relay line among the plurality of relay lines crossing the first spare line with an insulating layer between the first relay line and the first spare line, a second relay line among the plurality of relay lines crossing the second spare line with an insulating layer between the second relay line and the second spare line,
wherein each of the plurality of relay lines is connectable to any of the plurality of signal lines different from one another.

6. The display apparatus according to claim 1, wherein the first spare line and the second spare line in the opposing region are disposed along a common axis.

7. The display apparatus according to claim 1, wherein the metal pattern comprises a first portion extending in the extending direction, and a length of the first portion is longer than the predetermined gap.

8. The display apparatus according to claim 7, wherein the metal pattern further comprises a second portion extending from one end of the first portion and a third portion extending from other end of the first portion, the second portion of the metal pattern and the first end portion of the first spare line cross each other, and the third portion of the metal pattern and the second end portion of the second spare line cross each other.

9. The display apparatus according to claim 8, wherein the metal pattern has a U-shape in planar view.

10. The display apparatus according to claim 1, wherein the plurality of spare lines further comprises a third spare line, the third spare line extends in the extending direction in the opposing region and comprises a third end portion in the opposing region, the third end portion being an end portion in the extending direction, the second spare line is wholly arranged in the opposing region and further comprises a fourth end portion being an end portion in the extending direction and being opposite the second end portion, and with respect to a direction that is orthogonal to the extending direction, the third spare line and the second spare line are not overlapping in the opposing region, and the third end portion and the fourth end portion are opposed to each other in the extending direction with a predetermined gap being between the third end portion and the fourth end portion in the extending direction, the display apparatus further comprising a fourth metal pattern overlapping the third end portion of the third spare line and the fourth end portion of the second spare line with an insulating layer between the fourth metal pattern and each of the third end portion and the fourth end portion, so as to be connectable to the third end portion and the fourth end portion.

11. The display apparatus according to claim 10, wherein the second spare line and the third spare line in the opposing region are disposed along a common axis.

12. The display apparatus according to claim 2, wherein the first spare line, the second spare line, and the third metal pattern exist in a first metal layer, and the first metal pattern and the second metal pattern exist in a second metal layer different from the first metal layer.

* * * * *